Oct. 28, 1930.   A. W. DZAMBA   1,779,965
SNOW REMOVING AND MELTING DEVICE
Filed Jan. 20, 1930   2 Sheets-Sheet 1
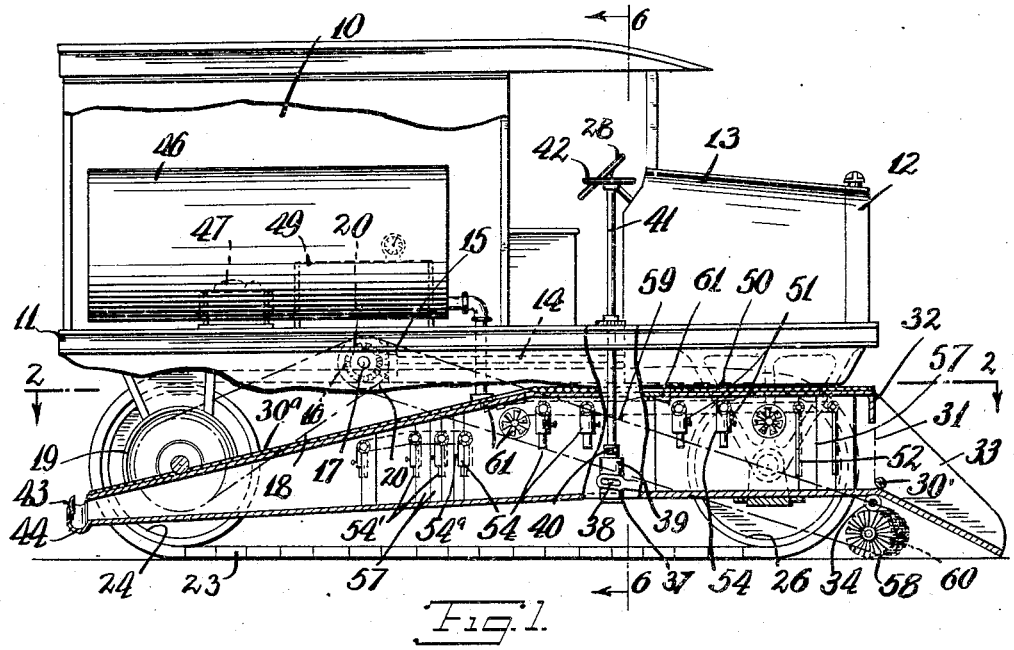
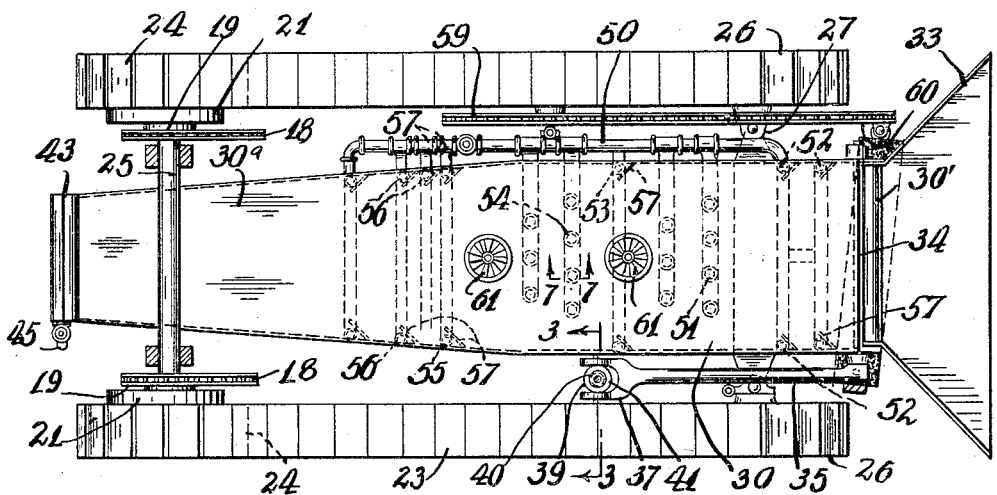
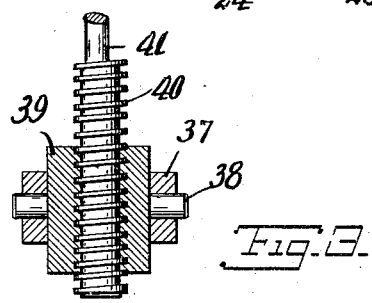
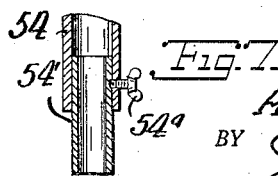
INVENTOR.
Andrew W. Dzamba
BY
ATTORNEY

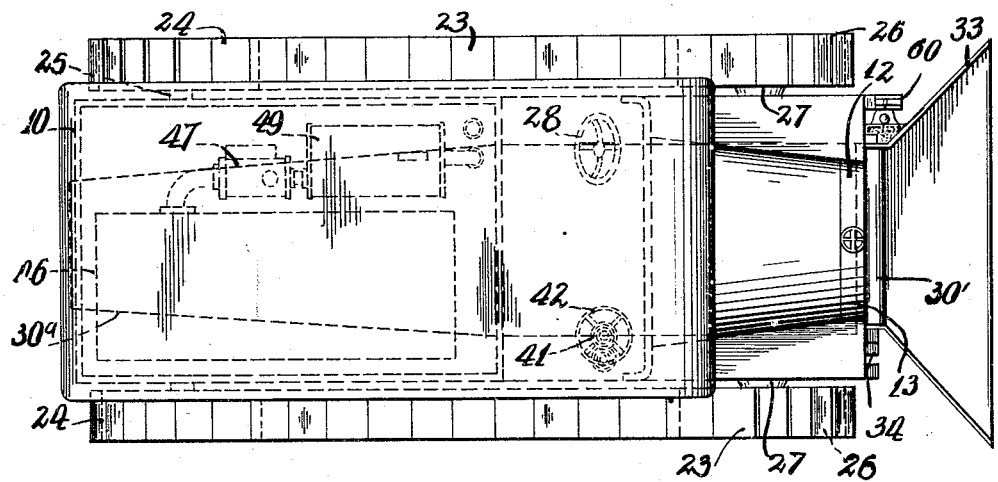
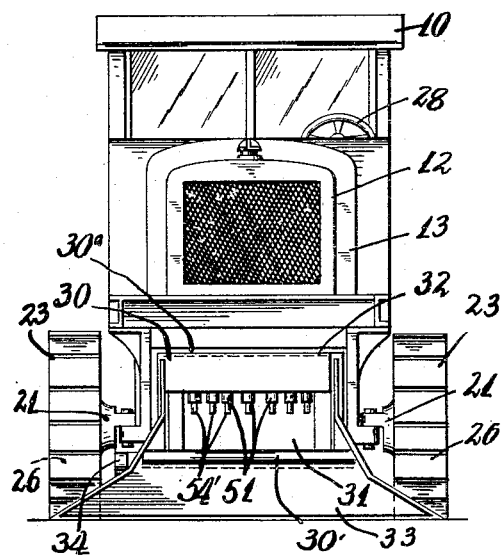
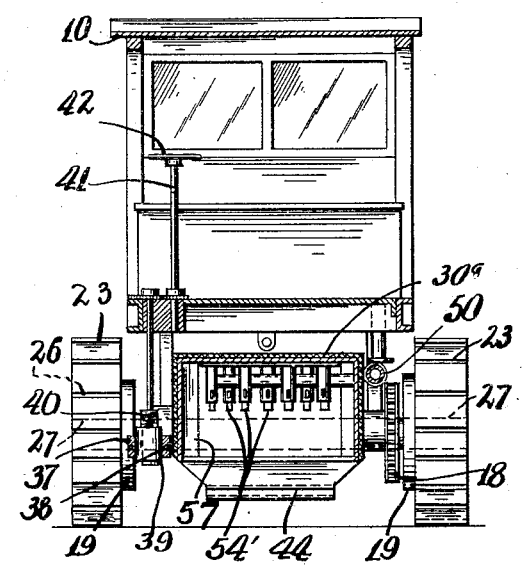

Patented Oct. 28, 1930

1,779,965

UNITED STATES PATENT OFFICE

ANDREW W. DZAMBA, OF JERSEY CITY, NEW JERSEY, ASSIGNOR OF ONE-SIXTH TO JOHN MELI AND ONE-SIXTH TO FRED J. MELI, BOTH OF JERSEY CITY, NEW JERSEY

SNOW-REMOVING AND MELTING DEVICE

Application filed January 20, 1930. Serial No. 422,185.

This invention relates to new and useful devices in the nature of a snow removing and melting vehicle, said device is particularly adapted for removing snow from streets, highways and the like.

The object of the invention is to provide a snow removing and melting device of novel construction and arrangement of parts hereinafter more fully described, claimed and illustrated in the accompanying drawings, in which:

Fig. 1 shows a side elevational view of my improved device, partly fragmentary and partly in section, so as to more clearly show the construction thereof.

Fig. 2 is a horizontal sectional view taken on the line 2—2 of Fig. 1.

Fig. 3 is an enlarged sectional view taken on the line 3—3 of Fig. 2.

Fig. 4 is a top plan view of my improved device.

Fig. 5 is a front elevational view thereof.

Fig. 6 is a vertical sectional view taken on the line 6—6 of Fig. 1.

Fig. 7 is a fragmentary vertical sectional view of the burners, taken on the line 7—7 of Fig. 2.

As here embodied my improved device comprises briefly a body 10 having the usual side members and a roof, so as to provide an enclosure or shelter. The body 10 is mounted on the chassis frame 11, adapted to support a radiator 12 and the hood 13. An internal combustion engine, such as ordinarily used to propel self driven vehicles, is mounted in the chassis frame 11, under the hood 13, and is provided with the usual clutch and transmission, which is operatively connected thereto and to the drive shaft 14. The bevel pinion 15 is attached to the drive shaft 14 and meshes with a pinion 16 attached to the cross shaft 17 rotatively mounted in the chassis frame 11. The sprocket chains 18 are extended over the sprocket wheels 19 and 20. The sprocket wheels 19 are attached to the tractor wheels 21 and the sprocket wheels 20 are attached to the cross shaft 17. The tractor belts 23 comprise a plurality of tractor shoes hinged to each other, so as to provide the usual tractor belts, such as commonly used. The tractor belts 23 are extended over the tractor wheels 24, which are rotatively mounted on the rear axle 25 and over the tractor wheels 26, which are rotatively attached to the front axle 27, which is provided with the usual steering mechanism controlled by the steering wheel 28, such as commonly used to steer self propelled vehicles.

The above described construction is such as will permit the above mentioned internal combustion engine to propel my improved device.

The snow container 30 covered with suitable heat insulator 30ª, such as asbestos is of hollow construction and is provided with an open forward end 31, having a downwardly extended element 32. The front member 33, of scoop shaped construction is pivotally attached, as at 34, by a rod, to the forward end of the snow container 30. The reach arm 35 is attached at its forward extremity to the rod 34 and is provided with a fork shaped rear extremity 37, provided with elongated apertures, adapted to be engaged by the pin 38, which is attached to and extended from the block 39. The block 39 is threadedly attached to the lower extremity 40, of the operating shaft 41, rotatively mounted in the chassis frame 11 and provided with a control wheel 42, located within easy reach of the driver of my improved device. The latter described construction is such as will permit the front member 33 to be pivotally raised or lowered as may be desired, so as to secure the proper relation of the said front member 33 to the ground.

The snow container 30 is constructed so as to have somewhat tapered sides, so as to provide a rear portion of somewhat smaller cross section. The tubular member 43 is attached to the rear portion of the snow container 30 and is extended crosswise thereto. The tubular member 43 is provided with an elongated opening 44 intercommunicative with the snow container 30 and is provided with the usual valve 45, attached to one extremity of the tubular member 43, which is closed at its other extremity.

The front of snow container 30 is provided with a roller 30' to facilitate the advancement of the snow at the lower part of the entrance of container 30.

The oil tank 46 is mounted in the body 10 and is adapted to hold fuel oil, crude oil or the like, the fuel pump 47 being connected to the oil tank 46 and to the pressure tank 49, which is connected to the supply line 50. A plurality of burners 51 are attached to the supply line 50 and are positioned in the center of the forward end of the snow container 30. The burners 52 are positioned at the side of the snow containers 30 directly ahead of the said burners 51, at the extreme front of the said snow container. The burners 53 are positioned at the sides of the snow container at the rear of the said burners 51. A plurality of burners 54 are positioned at the center of the snow container 30, at the rear of the said burners 53. The burners 55 and 56 are positioned at the sides of the snow container 30, at the rear of the said burners 54. The said burners 52, 53, 55 and 56, positioned at the sides of the snow container 30, are provided with baffle plates 57, attached to the sides of the snow container and extended therefrom, so as to prevent the snow from interfering with the latter mentioned burners. Burner tips 54' are slidably arranged within the lower portions of the burners 51, 52, 53, 54, 55 and 56 and set screws 54ª threadedly engage the burners and abut the tips 54' as a means for holding the tips in any desirable extended positions. This adjustable tip adapts the burners to better perform their functions.

The latter described construction is such as will permit the burners 52 to partially melt the snow, it is understood that the incoming snow will force the snow which has not been melted further into the snow container 30, so as to be melted by the remaining burners. It is further understood that the water resulting from the melted snow will collect at the rear of the snow container and in the tubular member 43 and is allowed to flow therefrom, into the street, by opening the valve 45, which is located at the curb side of the said street.

The usual sweeper 58, comprising a cylindrical broom, such as commonly used, is rotatively mounted in supports attached to the snow container 30 and is positioned so as to be in contact with the street surface and is at a relatively slight angular position to the said snow container, so as to sweep the snow, not collected in the snow container 30, to the curb side of the said street. The sprocket chain 59 is extended over a sprocket wheel attached to the above mentioned cross shaft 17 and over a sprocket wheel 60, attached to the sweeper 58, so as to rotate the said sweeper for the purpose as hereinbefore set forth.

The jaws 61 comprising a plurality of blades are rotatively mounted in the upper portion of the snow container 30, so as to supply the necessary air required to secure the combustion of the fuel feed to the said burners.

These rotary blades 61 may be located also on the sides or any other suitable location along the snow container 30.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, a truck comprising tractor belts for propelling said truck and a chassis, a body mounted on said chassis, heat generating apparatus mounted in said body, a snow receiver disposed below said chassis comprising a forward chamber section having a substantially horizontal bottom and a rear chamber section having a rearwardly inclined bottom, the side walls of said rear chamber section being converged rearwardly, a flared scoop pivotally attached to the forward end of said snow receiver and communicating with the space therein adapted to deliver snow thereto as said truck moves forwardly, spaced heat conducting pipes disposed downwardly through apertures in the top wall of said snow receiver adjacent the side walls thereof and provided with tips slidably mounted and lockable into various extended positions by means of set screws, and adapted to discharge a downwardly directed blast of heat for melting the side portions of the columns of snow delivered to said snow receiver by said scoop, spaced heat conducting pipes disposed downwardly through apertures in the top of said snow receiver located apart from the sides thereof and in back of said first mentioned pipes and provided with tips adjustably extendible for discharging a downwardly directed blast of heat on the middle portion of the column of snow delivered to said retainer by said scoop, and a drain pipe disposed laterally across the rear end of said snow container for discharging the melted snow delivered thereto by the rearwardly inclined bottom of said snow retainer.

2. In a device of the class described, a truck comprising a chassis and a body portion, heat generating apparatus mounted on said body portion, a snow container comprising a forward section having a substantially horizontal bottom and a rear section having a rearwardly inclined bottom, a scoop attached to the forward end of said snow retainer adapted to scrape snow from the path of said truck and progressively feed the same to said snow retainer, and downwardly directed heat pipes communicatively connected with said heat generating apparatus, disposed through the top of said snow retainer adjacent the sides thereof for melting the snow adjacent the sides of said retainer to reduce frictional engagement of the snow with said sides and to enable successive quantities of snow to be urged rearwardly through the forward section of said container, said heat pipes being provided with tips slidably mounted and lockable into various extended positions by means of set screws.

In testimony whereof I have affixed my signature.

ANDREW W. DZAMBA.